US009992314B2

(12) United States Patent
Beason

(10) Patent No.: US 9,992,314 B2
(45) Date of Patent: Jun. 5, 2018

(54) AUTOMATIC DEVICE MODE SWITCHING

(75) Inventor: Lawrence W. Beason, Overland Park, KS (US)

(73) Assignee: Garmin Switzerland GmbH (CH)

( * ) Notice: Subject to any disclaimer, the term of this patent is extended or adjusted under 35 U.S.C. 154(b) by 2645 days.

(21) Appl. No.: 12/019,291

(22) Filed: Jan. 24, 2008

(65) Prior Publication Data

US 2009/0191854 A1   Jul. 30, 2009

(51) Int. Cl.
*H04W 4/00* (2009.01)
*H04M 1/04* (2006.01)
*H04M 1/725* (2006.01)
*G01C 21/26* (2006.01)

(52) U.S. Cl.
CPC ............ *H04M 1/04* (2013.01); *G01C 21/265* (2013.01); *H04M 1/72527* (2013.01); *H04M 1/72563* (2013.01); *H04M 2250/10* (2013.01); *H04M 2250/12* (2013.01)

(58) Field of Classification Search
CPC .... G06F 1/1632; G06F 1/1626; G06F 1/1684; G06F 1/1613; G01C 21/26; G01C 21/00; G01C 21/3476; G01C 21/367; H04M 1/0212; H04M 1/0233; H04M 1/0241; H04M 1/72552; H04M 2207/18; H04M 2005/443
USPC ............................ 455/456.6, 456.1; 340/988
See application file for complete search history.

(56) References Cited

U.S. PATENT DOCUMENTS

| | | | |
|---|---|---|---|
| 6,321,158 B1 * | 11/2001 | DeLorme et al. | 701/201 |
| 6,330,149 B1 | 12/2001 | Burrell | 361/683 |
| 6,654,826 B1 * | 11/2003 | Cho et al. | 710/62 |
| 6,658,272 B1 * | 12/2003 | Lenchik et al. | 455/575.1 |
| 7,142,195 B2 * | 11/2006 | Northway et al. | 345/169 |

(Continued)

FOREIGN PATENT DOCUMENTS

| | | |
|---|---|---|
| JP | 2001-045570 | 2/2001 |
| JP | 2002-277274 | 9/2002 |

(Continued)

OTHER PUBLICATIONS

Verizon Wireless, VZ Navigator—Answers to FAQs, 11 pages, published prior to Jan. 24, 2008.

(Continued)

*Primary Examiner* — Lester Kincaid
*Assistant Examiner* — Diego Herrera
(74) *Attorney, Agent, or Firm* — Samuel M. Korte; Mohammad M. Ali

(57) ABSTRACT

Techniques are described for automatic device mode switching. In an implementation an electronic device provides a variety of functionality through multiple modes of the electronic device. The electronic device may be configured to toggle between modes when inserted into or removed from a corresponding mounting device. In an implementation, one operational mode may be automatically activated upon insertion of the electronic device into the mounting device. Another operational mode may be automatically activated when the electronic device is removed from the mounting device. In another implementation, multiple modes of an electronic device may be associated with multiple orientations of the device. An orientation detector may provide signals indicative of orientation, which when detected causes automatic activation of an associated operational mode.

35 Claims, 6 Drawing Sheets

(56) References Cited

U.S. PATENT DOCUMENTS

| | | | |
|---|---|---|---|
| 7,348,922 B2 * | 3/2008 | Chang et al. | 342/357.25 |
| 7,493,088 B2 * | 2/2009 | Levy et al. | 455/67.11 |
| 7,545,784 B2 * | 6/2009 | Mgrdechian et al. | 370/338 |
| 7,788,188 B2 * | 8/2010 | Kramer | 705/319 |
| 7,817,085 B2 * | 10/2010 | Harris | 342/357.21 |
| 2003/0114206 A1 * | 6/2003 | Timothy et al. | 455/575 |
| 2004/0203897 A1 * | 10/2004 | Rogers | 455/456.1 |
| 2005/0054352 A1 * | 3/2005 | Karaizman | 455/456.3 |
| 2005/0170803 A1 | 8/2005 | Jo | 455/234.1 |
| 2007/0004451 A1 * | 1/2007 | Anderson | 455/556.1 |
| 2007/0038364 A1 * | 2/2007 | Lee et al. | 701/200 |
| 2007/0085759 A1 * | 4/2007 | Lee et al. | 345/1.1 |
| 2008/0059061 A1 * | 3/2008 | Lee | 701/209 |
| 2008/0059888 A1 * | 3/2008 | Dunko | 715/744 |
| 2008/0065722 A1 * | 3/2008 | Brodersen et al. | 709/203 |
| 2010/0004031 A1 * | 1/2010 | Kim | 455/566 |
| 2010/0123737 A1 * | 5/2010 | Williamson et al. | 345/672 |

FOREIGN PATENT DOCUMENTS

| | | |
|---|---|---|
| JP | KR 10-2004-0051202 | 6/2004 |
| JP | 2007-304064 | 11/2007 |

OTHER PUBLICATIONS

Wikipedia, iPhone, 17 pages, published Jan. 23, 2008.

International Search Report from corresponding International Application No. PCT/US2009/031720, dated Aug. 31, 2009.

* cited by examiner

AUTOMATIC DEVICE MODE SWITCHING

The popularity of portable electronic devices, such as mobile phones, position-determining devices, audio players, media players and so forth is ever increasing. Traditionally portable electronic devices were configured as single function devices, such as a mobile phone limited to phone service, an audio player limited to playing music, and so on.

As the popularity of portable electronic devices increased, manufacturers responded be developing cross-functional devices that provided multiples functions in multiple modes of a single device. However, to switch between interacting with different functions and modes when using a traditional portable electronic device, a user was required to manually select different modes associated with different functionality.

For instance, to switch between different functions or modes, a user might be required to manually operate a switch or to manually close one application executing on the device and select another application to execute on the device. Thus, navigation to switch between functions and modes of traditional portable electronic device was time consuming and involved considerable user intervention, which was frustrating to the user and detracts from the user experience.

SUMMARY

Techniques are described for automatic device mode switching. In an implementation, an electronic device provides a variety of functionality through multiple modes of the electronic device. The electronic device may be configured to toggle between modes when inserted into or removed from a corresponding mounting device. In an implementation, one operational mode may be automatically activated upon insertion of the electronic device into the mounting device. Another operational mode may be automatically activated when the electronic device is removed from the mounting device. In another implementation, multiple modes of an electronic device may be associated with multiple orientations of the device. An orientation detector may provide signals indicative of orientation, which when detected causes automatic activation of an associated operational mode.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

As the popularity of portable electronic devices has increased, manufacturers have responded by developing cross-functional devices that may provide multiples functions in different modes of a single device. Traditionally, switching modes in these devices was time consuming and involved considerable user intervention. For example, to switch between different functions or modes, a user might be required to manually operate a switch or to manually close one application executing on the device and select another application to execute on the device. This interaction to switch modes may also be quite irritating to the user, particularly when the user is "on the go", e.g., driving in a car, hiking, and so forth.

Accordingly, techniques are described for automatic device mode switching. In an implementation an electronic device provides a variety of functionality through multiple modes of the electronic device. The electronic device may be configured to toggle between modes when inserted into or removed from a corresponding mounting device. For instance, one operational mode may be automatically activated upon insertion of the electronic device into the mounting device. Another operational mode may be automatically activated when the electronic device is removed from the mounting device. In another implementation, multiple different modes of an electronic device may be associated with multiple orientations of the device. An orientation detector may provide signals indicative of orientation. The detection of orientation of the device via the signals may cause an associated operational mode to be automatically activated.

In the following discussion, an exemplary environment and devices are first described that are operable to perform automatic device mode switching techniques. Exemplary procedures are then described that may be employed with the exemplary environment and devices, as well as with other environments and devices without departing from the spirit and scope thereof.

Exemplary Environment

Figure 1:
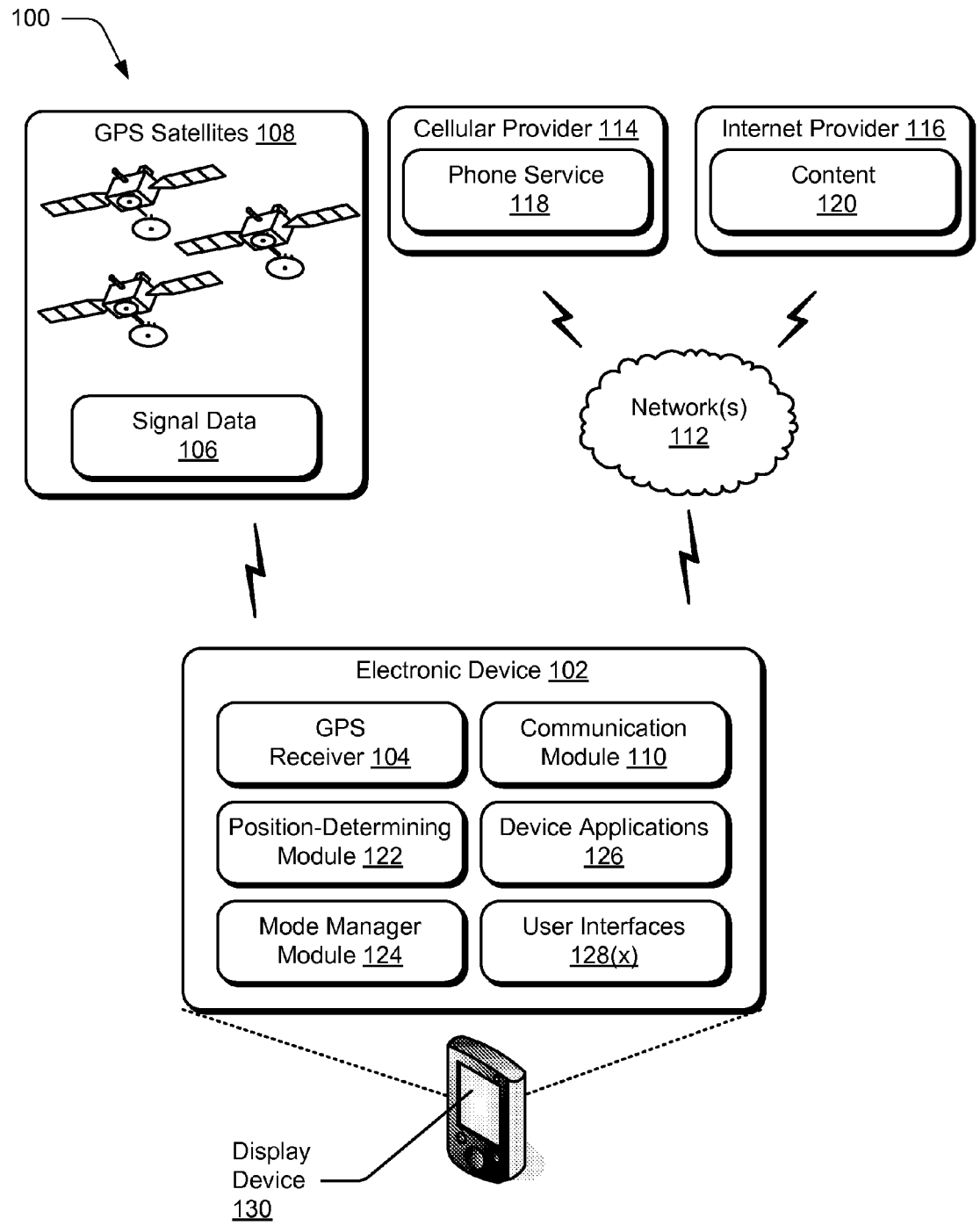
FIG. 1 depicts an exemplary environment in which automatic device mode switching techniques may be employed.

FIG. 1 illustrates an implementation of an environment 100 in which techniques for automatic device mode switching may be employed. In the depicted example, the environment 100 includes an electronic device 102. Electronic device 102 may be configured to provide a variety of functionality through various application modules and operational modes of the electronic device 102. A variety of electronic devices 102 suitable to provide the variety of functionality are contemplated. For instance, an electronic device 102 may be configured as devices including, but not limited to: a mobile phone; a position-determining device; a portable computer; a personal digital assistant; a multimedia device; a game device; and/or combinations thereof. In the following description a referenced component, such as electronic device 102, may refer to one or more entities, and therefore by convention reference may be made to a single entity (e.g., the electronic device 102) or multiple entities (e.g., the electronic devices 102, the plurality of electronic devices 102, and so on) using the same reference number.

In an implementation, electronic device 102 may include functionality to determine position. For example, electronic device 102 is depicted as including a global positioning system (GPS) receiver 104 that represents functionality to receive signal data 106 from GPS satellites 108. Electronic device 102 also includes a communication module 110 representative of communication functionality to permit electronic device 102 to send/receive data between different devices (e.g., components/peripherals) and/or over the one or more networks 112. Communication module 110 is representative of a variety communication components and functionality including, but not limited to: one or more antennas; a browser, a transmitter and/or receiver; a wireless radio, data ports; software interfaces and drivers; networking interfaces; data processing components; and so forth.

The one or more networks 112 are representative of a variety of different communication pathways and network connections which may be employed, individually or in combinations, to communicate among the components of the environment 100. Thus, the one or more networks 112 may be representative of communication pathways achieved using a single network or multiple networks. Further, the one or more networks 112 are representative of a variety of different types of networks and connections that are contemplated including but not limited to: the Internet; an intranet; a satellite network; a cellular network; a mobile data network; wired and/or wireless connections; and so forth.

Examples of wireless networks include but are not limited to networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through universal serial bus (USB), Ethernet, serial connections, and so forth.

For example, electronic device 102 through functionality represented by the communication module 110 may be configured to communicate via one or more networks 112 with a cellular provider 114 and an internet provider 116 to receive mobile phone service 118 and various content 120 respectively. Content 120 may represent a variety of different content examples of which include but are not limited to web pages, services, music, video, email service, instant messaging and so forth.

As noted, electronic device 102 may be configured to determine position. More particularly, electronic device 102 may include a position-determining module 122, that may manage and process signal data 106 received from the GPS satellites 108 via the GPS receiver 104. For example, electronic device 102 may receive signal data 106 transmitted by one or more position data platforms and/or position data transmitters, examples of which are the depicted as the GPS satellites 108. The position-determining module 122 is representative of functionality operable to determine a geographic position through processing of the received signal data 106. The signal data 106 may include various data suitable for use in position determination, such as timing signals, ranging signals, ephemerides, almanacs, and so forth. Position-determining module 122 may also be configured to provide various other position-determining functionality, such as indicating location on a map, tracking speed and distance, providing navigation instructions, providing trip data, and so forth. Thus, position-determining module 122 may manage and process signal data 106 from GPS satellites 108 to provide a variety of position-determining functionality, further discussion of which may be found in relation to FIG. 2.

Although a GPS system is described and illustrated in relation to FIG. 1, it should be apparent that a wide variety of other positioning systems may also be employed, such as terrestrial based systems (e.g., wireless-phone based systems that broadcast position data from cellular towers), wireless networks that transmit positioning signals, and so on. For example, positioning-determining functionality may be implemented through use of a server in a server-based architecture, from a ground-based infrastructure, through one or more sensors (e.g., gyros, odometers, and magnetometers), use of "dead reckoning" techniques, and so on.

In accordance with the automatic device mode switching techniques described herein, electronic device 102 is also illustrated a including a mode manager module 124. Mode manager module 124 is representative of functionality to toggle, select, activate or otherwise manage multiple operational modes of the electronic device 102 responsive to various inputs. For example, operational modes may be activated or toggled based upon insertion or removal of an electronic device 102 into or out of a corresponding mounting device, further discussion of which may be found in relation to FIGS. 3 through 4. In another example, operational modes may be activated or toggled based upon detecting manipulation of an electronic device 102, such as detecting of orientation, movement, speed, impact, and so forth. Further discussion of mode switching based upon detecting manipulation of an electronic device 102 may be found in relation to FIGS. 5 through 6. A variety of other examples are also contemplated.

Operational modes may represent different distinct functionality that may be provided by an electronic device 102 through various hardware, software and combinations thereof. For example, one operational mode may correspond to position-determining functionality (e.g., navigation) that may be provided via the GPS receiver 104 and position-determining module 122. Another operational mode may correspond to phone service 118 that may be provided via a cellular network (e.g., networks 112) and communication module 110. Yet another operational mode may correspond to receiving content 120 that may be provided from Internet provider 116 via a wireless network (e.g., networks 112) and communication module 110.

To provide the variety of functionality, electronic device 102 may include a variety of device applications 126. At least some of the device applications 126 provide functionality that is related to a particular operational mode of the electronic device 102. For example, the position-determining module 122, although shown separately, may be considered a device application 126 that is related to a position-determining mode or navigation mode.

Further, the device applications 126 may operate to form corresponding user interfaces 128($x$) that may be output on a display device 130 to provide interactions with the respective functionality in different operational modes. Thus, a particular user interface 128($x$) may be output when a corresponding operational mode is selected or activated, such that a user may interact with functionality related to the selected or activated operational mode. Further discussion of various functionality that may be provided via multiple operational modes of an electronic device 102 may be found in relation to the following description of FIG. 2.

Figure 2:
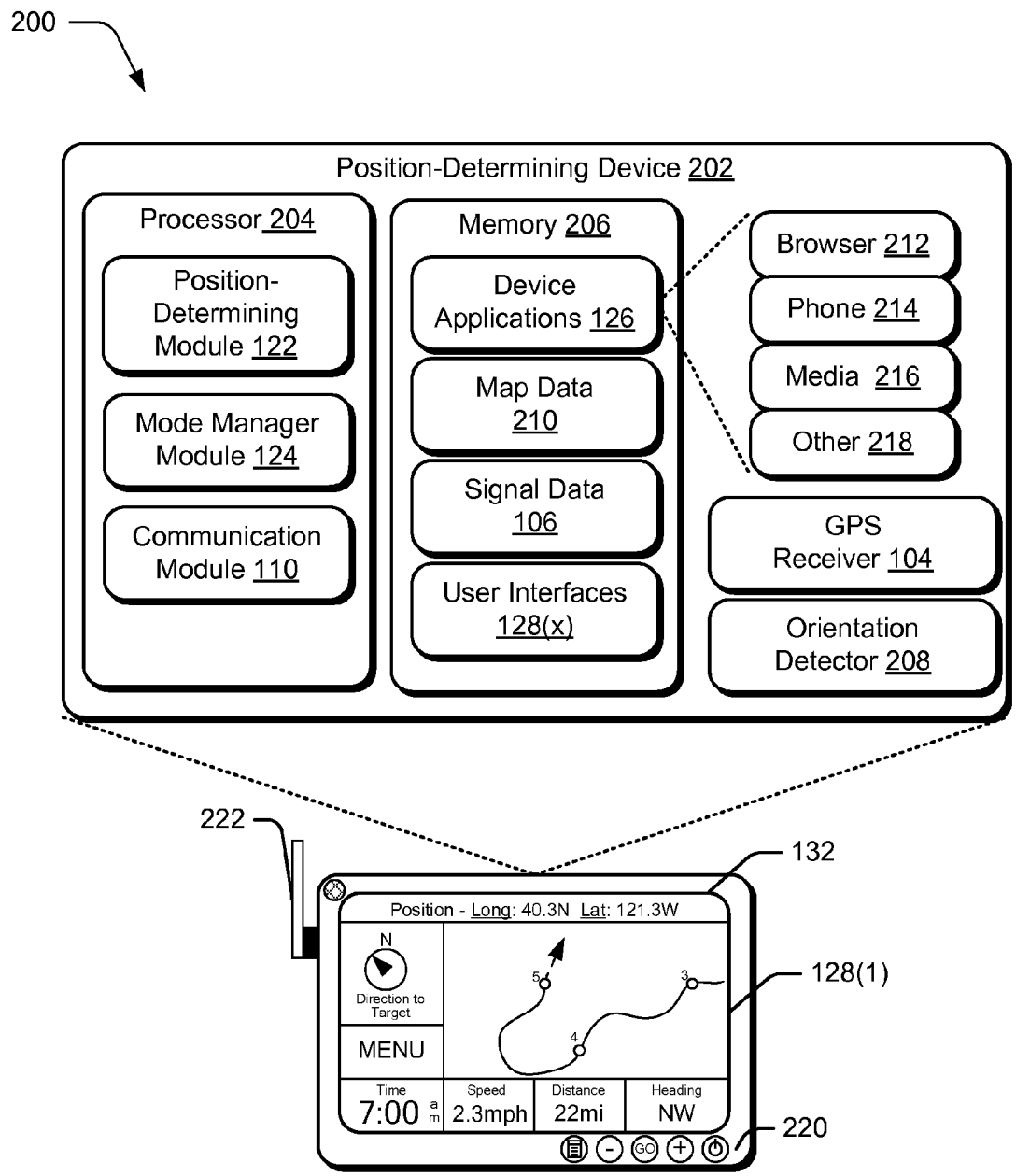
FIG. 2 depicts an exemplary implementation of electronic device in the environment of FIG. 1 in greater detail.

FIG. 2 depicts an implementation 200 depicting an example of an electronic device 102 of FIG. 1 in greater detail. In particular, an example electronic device 102 of FIG. 1 is illustrated as a position-determining device 202.

The example position-determining device 202 of FIG. 2 is illustrated as including a respective processor 204 and memory 206 that may be utilized to provide a variety of processing and storage capabilities. Example position-determining device 202 further includes an orientation detector 208 that represents functionality to determine various manual manipulation of the position-determining device 202. Orientation detector 208 may be configured in a variety of ways to provide signals to enable detection of different manual manipulation of the position-determining device 202 including but not limited to detecting orientation, motion, speed, impact, and so forth. For example, orientation detector 208 may be representative of various components used alone or in combination, such as an accelerometer, gyroscope, velocimeter, capacitive or resistive touch sensor, and so on. Further discussion of the operation of orientation detector 208 to perform automatic device mode switching techniques may be found in relation to FIG. 5 through 6.

Processor 204 is not limited by the materials from which it is formed or the processing mechanisms employed therein, and as such, may be implemented via semiconductor(s) and/or transistors (e.g., electronic integrated circuits (ICs)), and so forth. Additionally, although a single memory 206 is shown for the position-determining device 202, a wide variety of types and combinations of memory may be employed, such as random access memory (RAM), hard disk memory, removable medium memory (e.g., the memory 206 may be implemented via a slot that accepts a removable memory cartridge), and other types of computer-readable media.

In the example of FIG. 2 position-determining module 122, mode manager module 126 and communication module 110 are illustrated as executed via processor 204 and are also storable in the memory 206.

Memory 206 is illustrated a storing various device applications 126, signal data 106 that may be received via the GPS receiver 104; map data 210 that may be locally maintained by the position-determining device 202; and user interfaces 128(x) that may be formed and output via the various device applications 126.

Additional device applications 126 are illustrated as including a browser 212 application, a phone 214 application, and a media 216 application. Each of these applications may correspond to an operational mode of the position-determining device 202. The browser 212 may represent functionality executable on the processor 204 to interact with content 120 from an internet provider 116 of FIG. 1, such as to obtain email service, send/receive instant messaging, view web pages, download video programs or other content 120, and so forth. Phone 214 application may represent functionality executable on the processor 204 to obtain phone service 118 from a cellular provider 116 of FIG. 1, such as to make and receive mobile phone calls, manage contacts, create/send/receive text messages and so on. Media 216 application may represent functionality executable on the processor 204 to manage a media content library that may include music files, photos and videos, such as to organize the media, playback media, edit media and so on. A variety of other 218 applications may also be included to provide additional functionality to the electronic device 102. These device applications 126, as well as the position-determining module 122, may correspond to different operational modes of the position-determining device 202 through which different distinct functionality is available and/or activated at different times. For instance, position-determining device 202 may have a navigation mode, internet mode, phone mode and media mode that correspond respectively to the position-determining module 122, browser 212, phone 214 application, and media 216 application respectively.

Other 218 applications may include but are not limited to games, database, productivity suite, an operating system, drivers, desktop applications, device specific applications, and so forth. The other 218 applications may also correspond to operational modes, for example a game mode and/or a productivity suite mode.

In operation, the mode manager module 124 may activate, select, toggle between and/or otherwise manage the operational modes of position-determining device 202. For instance, in the depicted example, execution of the position-determining module 122 on the processor 204 may result in forming a corresponding user interface 128(1) that is depicted in FIG. 2 as output to provide position-determining functionality. When the user interface 128(1) is active, the position-determining device 202 may be considered to be in a navigation mode. Responsive to various inputs, mode manager module 124 may initiate a mode switch to another mode that may result in a different device application 126 being executed and/or activated, along with output of a different user interface 128(x) that correspond to the other mode. A variety of inputs are contemplated that may cause mode manager module 124 to initiate an automatic switch between modes, as discussed in relation to the following figures.

In particular, when a particular operational mode is active, a corresponding device application 126 may be executed in an active state on the processor 204. In the active state, the device application 126 provides primary functionality for the position-determining device 202. A corresponding user interface 128(x) may be output in the foreground on the display device 130, e.g., the corresponding user interface 128(x) is visible. When the particular operational mode is not active (e.g., another mode is active) the corresponding device application 126 may be executed in a background state on the processor 204. In the background state, the corresponding device application 126 may continue to operate to provide associated functionality. However, the corresponding user interface 128(x) may be closed out, sent behind an active interface, minimized, or otherwise made not visible on the display device. Additionally or alternatively, switching of operational modes may cause execution of device applications 126 corresponding to active and inactive operational modes to begin and end respectively. Thus, switching of operational modes may include automatically switching between states of corresponding device applications 126 from active to background and/or causing execution of device applications 126 to automatically begin and end.

For example, a telephone call initiated in a phone mode may continue in a background state when a navigation mode is active, such as through various hands-free interactions, e.g., automatic speech recognition, speaker phone, a wireless headset, and so on. Likewise, position-determining functionality initiated in a navigation mode, such as turn-by-turn navigation instructions, may continue in a background state when a phone mode is selected to answer an incoming call. In this manner, primary functionality may be selected through switching of modes and execution of a corresponding device application 126 in an active state, while functionality of a non-active mode may continue to be available through execution of a different device application 126 in a background state.

Position-determining functionality, for purposes of discussion herein, may relate to a variety of different navigation techniques and other techniques that may be supported by "knowing" one or more positions. For instance, position-determining functionality may be employed to provide location information, timing information, speed information, and a variety of other navigation-related data. Accordingly, the position-determining device 202 may be configured in a variety of ways to perform a wide variety of functions. For example, the positioning-determining device 202 may be configured for outdoor navigation as illustrated, vehicle navigation, aerial navigation (e.g., for airplanes, helicopters), marine navigation, personal use (e.g., as a part of fitness-related equipment), and so forth. Accordingly, the position-determining device 202 may include a variety of devices to determine position using one or more of the techniques previously described.

The position-determining module 122, for instance, may be executed to use signal data 106 received via the GPS receiver in combination with map data 210 that is stored in the memory 206 to generate navigation instructions (e.g., turn-by-turn instructions to an input destination), show a current position on a map, and so on. Position-determining device 202 may include one or more antennas 222 to receive signal data 106 as well as to perform other communications, such as communication via the one or more networks 112 of FIG. 1. The position-determining module 122 may also be executed to provide other position-determining functionality, such as to determine a current speed, calculate an arrival time, and so on.

In an embodiment, position-determining device 202 includes at least two antennas 222 configured to receive signal data 106 when the position-determining device 202 is in different respective arrangements and/or orientations, as is described in the copending U.S. patent application of Lawrence W. Beason, application Ser. No. 12/019,221, filed on Jan. 24, 2008 and titled Antenna Configuration for Device Having Location Determining Capability, which is herein incorporated by reference in its entirety.

A switching of operational modes for a position-determining device 202 that has two such antennas 222 may include automatically switching among operation of different antennas to provide position-determining functionality. For example, an orientation change detected through the orientation detector 208 as described herein may cause a corresponding change between using first and second antennas to receive signal data from GPS satellites 108 in the different orientations. Likewise, a change in arrangement of position-determining device 202, such as by insertion into or removal from a mounting bracket as described herein, may cause a corresponding switch between using first and second antennas 222 to receive signal data from GPS satellites 108 in the different arrangements. A switch between antennas 222 may occur along with additional changes in operational modes (e.g., switching from navigation mode to phone mode) or while the active mode otherwise remains the same (e.g., operational mode switch changes use of antennas while navigation mode remains active). A variety of other examples are also contemplated.

Position-determining device 202 may be configured to receive inputs from a user to interact with the variety of functionality that may be provided via the position-determining device 202. For example, the position-determining device 202 may be configured with a touch-screen that is responsive to direct touch, indirect touch (e.g., changes in electric field, heat, or other surface properties of the touch-screen) surface contact, pressure, and so forth. Accordingly, user interfaces 128(x) may be configured to define selectable areas of the touch-screen to perform various functions. In addition, various input controls 220 such as buttons, dials, microphones, and so forth may be provided to receive additional types of user input. The orientation detector 208 may provide signals to recognize other types of user manipulations, such as tapping externally on the position-determining device 202, rotation, motion of the position-determining device 202, and so forth.

Generally, any of the functions described herein can be implemented using software, firmware, hardware (e.g., fixed logic circuitry), manual processing, or a combination of these implementations. The terms "module" and "functionality" as used herein generally represent software, firmware, hardware or a combination thereof. In the case of a software implementation, for instance, the module represents executable instructions that perform specified tasks when executed on a processor, such as the processor 204 with the position-determining device 202 of FIG. 2. The program code can be stored in one or more computer-readable media, an example of which the memory 206 associated with the position-determining device 202 of FIG. 2.

Exemplary Procedures

The following discussion describes techniques for automatic device mode switching that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1 and the example devices of FIG. 2. The features of techniques described below are platform-independent, meaning that the techniques may be implemented on a variety of commercial computing platforms having a variety of processors.

Figure 3:
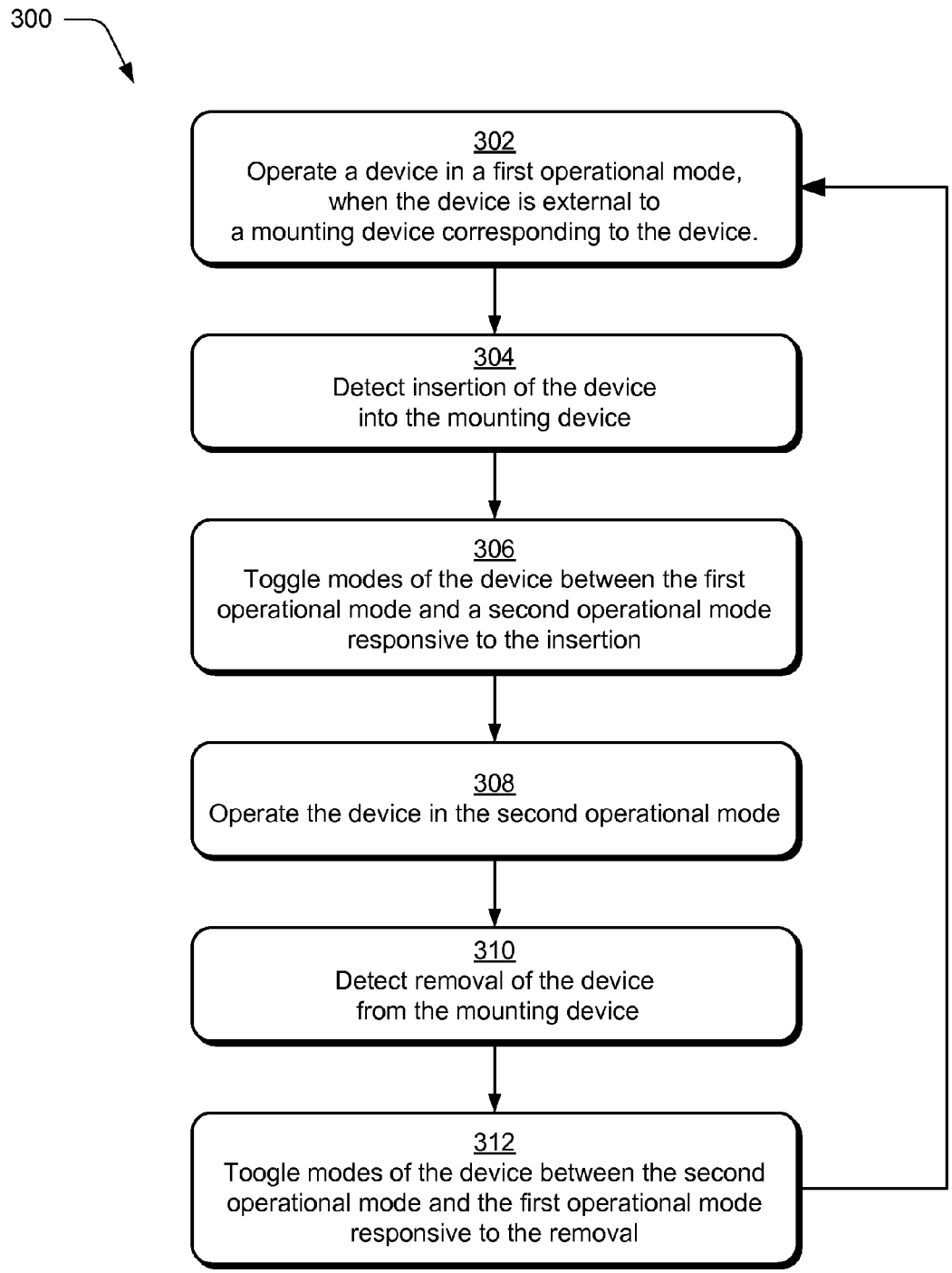
FIG. 3 is a flow diagram depicting an exemplary procedure in which operational modes of an electronic device are toggled based upon insertion or removal of the electronic device from a corresponding mounting device.

FIG. 3 depicts a procedure 300 in an exemplary implementation in which operational modes of an electronic device are toggled based upon insertion and removal of an electronic device into and out of a corresponding mounting device. In discussing procedure 300, reference will be made to FIG. 4 which illustrates an exemplary implementation 400 showing insertion and removal of an example position-determining device 202 into and out of a corresponding mounting device 402.

Figure 4:
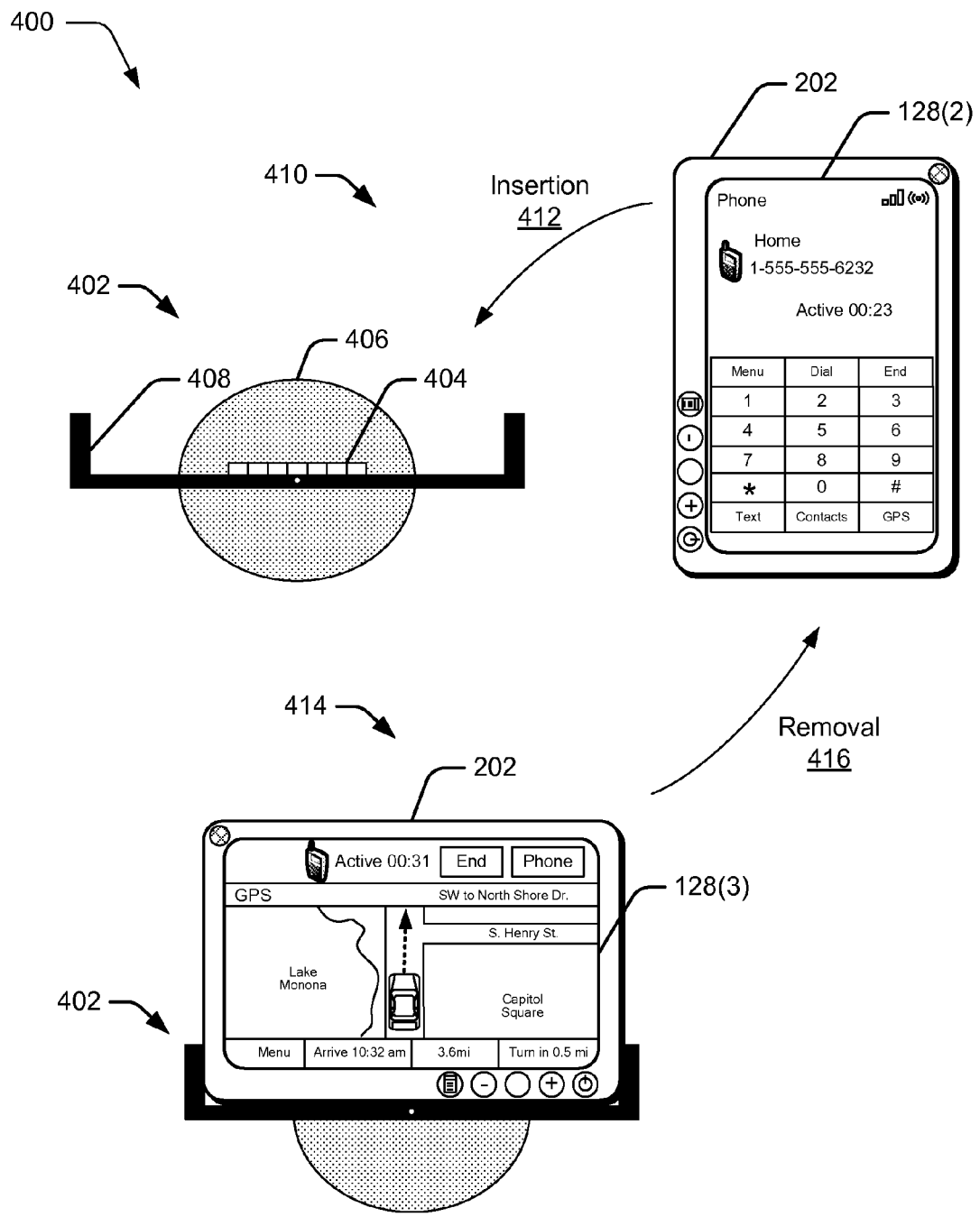
FIG. 4 is a diagram illustrating an exemplary implementation of the automatic device mode switching procedure depicted in FIG. 3.

Referring now to FIG. 4, the example mounting device 402 depicted may be configured in a variety of ways to secure a corresponding position-determining device 202. For example, the mounting device 402 may be arranged as a bracket to secure to a position-determining device 202 when used in a vehicle, such as a boat, automobile, aircraft and so forth. The mounting device 402 may be arranged to include an interface 404, a securing portion 406, and one or more supporting portions 408. The interface 404 may be configured to include various electrical contacts and connectors which may couple the position-determining device 202 to an external power supply, an antenna, a network connection and so forth, when the position-determining device 202 is inserted into the mounting device 402. In an implementation, securing portion 406 may be configured as a suction cup mounting portion that secures the mounting device 402 and an inserted position-determining device 202 to a dashboard, windshield, and so forth. A variety of other securing portions 406 are also contemplated, including fixed mounts, in-dash mounts (both fixed and removable), bean bag mounts, and the like. Likewise, a variety of supporting portions 408 are contemplated that are suitable to hold and/or arrange a position-determining device 202 when inserted into the mounting device 402.

Referring back to procedure 300 of FIG. 3, a device is operated a first operational mode when the device is external to a mounting device corresponding to the device (block 302). For example, in the top portion of FIG. 4, an arrangement 410 is illustrated in which a position-determining device 202 is illustrated as external to or removed from the mounting device 402. In this example, the position-determining device 202 may be operated in a first operational mode. More particularly, the example position-determining device 202 is illustrated in FIG. 4 as operating in a phone mode in which a corresponding user interface 128(2) is active on the position-determining device 202. In the first operational mode (e.g., phone mode), the phone 214 application of FIG. 2 may be executed on the processor 204 in an active state to form and/or output user interface 128(2), and to provide various phone functionality, such as sending/receiving calls, text messaging, managing contacts, and so forth. Mode manager module 124 may operate to select and/or set the phone mode as a default or normal operational mode when the position-determining device 202 is out of the mounting device 402. Thus, when the position-determining device 202 is out of the mounting device 402, mode manager module 124 may cause operation of the phone application 214 which may include executing the phone application when not already running, activating the phone application when running in a background state, and/or switching presentation on the display device 130 to actively display the user interface 128(2) corresponding the phone 214 application to a viewer. Additionally, the interface 128(2) through which phone functionality is available may be arranged to be presented in a portrait orientation by default as shown, which may also be controlled by the mode manager module 124.

Insertion of the device into the mounting device is detected (block 304). For instance, FIG. 4 further illustrated an insertion act 412 in which the position-determining device 202 is mounted into the mounting device 402. The result is an arrangement 414 in which the position-determining device 202 is illustrated as inserted into (e.g., connected to) the mounting device 402. In an implementation, the position-determining device 202 may be configured to be mounted in a landscape orientation as shown. When insertion act 412 occurs, position-determining device 202 may be configured in a variety of ways to detect the insertion act 412. For example, mode manager module 124 may detect the insertion based upon connection of the position-determining device 202 to the interface 404 portion of the mounting device 402. Electrical contact between the position-determining device 202 and the interface 404 may cause input signals to be detected by the mode manager module 124 which may then initiate various actions related to selection of operational modes of the position-determining device 202 in response. A variety of other techniques to detect insertion and removal of a position-determining device 202 are also contemplated, examples of which include but are not limited to using signals generated by orientation detector 208 upon insertion, using an accelerometer to detect the impact and/or movement, and using a mechanical switch coupled to the position-determining device 202 that is operated upon insertion/removal of the position-determining device 202.

Modes of the device are toggled between the first operational mode and a second operational mode responsive to the insertion (block 306). For instance, when mode manager module 124 detects the insertion act 412, mode manager module 124 may operate to toggle modes of the position-determining device 202. More particularly, the example position-determining device 202 is illustrated as operating in a second operation mode (e.g., navigation mode) in which a corresponding user interface 128(3) to provide position-determining functionality is active on the position-determining device 202. In the second operational mode (e.g., navigation mode), the position-determining module 122 of FIG. 2 may be executed on the processor 204 in an active state to form a corresponding user interface 128(3) which may be output to provide various navigation functionality, such as turn-by-turn navigation, speed and distance calculation, route planning, and so forth. Mode manager module 124 may operate to select and/or set the navigation mode as a default or normal operational mode when the position-determining device 202 is mounted in the mounting device 402. Thus, when the position-determining device 202 is inserted in the mounting device 402, the mode manager module 124 may cause operation of the position-determining module 122, which may include executing the position-determining module 122 if not already running, activating the position-determining module 122 when running in a background state, and/or switching presentation on the display device 130 to actively display the user interface 128(3) corresponding the position-determining module 122 to a viewer. Additionally, the interface 128(3) through which position-determining functionality is available may be arranged to be presented in landscape orientation by default as shown, which may also be controlled by the mode manager module 124.

The device is operated in the second operational mode (block 308). For example, when the position-determining device 202 is mounted in the mounting device 402, the user interface 128(3) may be actively presented on the display device as shown in relation to the arrangement 414 of FIG. 4.

Thus, mode manager module 124 may be configured to monitor connection of the position-determining device 202 to the mounting device 402 and take actions to select, toggle, or otherwise switch between operational modes when an insertion or removal of the position-determining device 202 is detected, e.g., connected to or disconnected from the interface 404. Generally, toggling or switching between the operational modes may be considered as selecting the active mode or "primary" mode. Accordingly, the selected "primary" mode may determine which device application(s) 126 are executed and/or in an active state in the foreground, and which corresponding user interfaces 128(x) are presented via the display device 130. Further, since the user interfaces 128(x) that correspond to different operational modes may each be associated with different functionality (e.g., phone functionality vs. position-determine functionality), the selected "primary" mode also changes which corresponding functionality is available at a given time.

It is noted that multiple different device applications 126 may continue to operate regardless of which operational mode is selected as the "primary mode". Thus, as previously discussed, in phone mode the position-determining module 122 may still operate in a background state to calculate position, provide turn-by-turn navigation and so forth. However, in phone mode the primary functionality available directly through the user interface 128(2) is phone functionality. Likewise, in navigation mode, the phone 214 application may still operate in a background state to receive calls, continue an active call, and so on. For instance, in navigation mode the phone 214 application may operate to provide "hands-free" phone functions through the user interface 128(3) that is output in navigation mode, as shown. However, in navigation mode the primary functionality available directly through the user interface 128(3) is position-determining functionality.

In the example of FIG. 4, the different operational modes phone mode and navigation mode are illustrated as also being presented on the position determining device 202 in portrait and landscape orientation respectively. Thus, in addition to changing the active functionality available on the position-determining device 202 at a given time, a change in operational mode may also include a change in the orientation from portrait to landscape and vice versa. However, in another example a change in operational mode may occur without a change in the device orientation. For instance, the phone mode and navigation mode depicted in the arrangements 410 and 414 respectively may each be presented in portrait orientation or alternatively in landscape mode. In an implementation, the orientation that is associated with one or more operational modes available on a position-determining device 202 may be configurable by a user.

Removal of the device from the mounting device is detected (block 310). For example, FIG. 4 further depicts a removal act 416 which causes a change from the arrangement 414 in which position-determining device 202 is mounted the mounting device 402 to arrive at the arrangement 410 in which the position-determining device 202 is external to the mounting device 402. For instance, a user may remove the position-determining device 202 to answer a phone call, to take the position-determining device 202 with them when exiting a vehicle, and so on. The mode manager module 124 may be further configured to detect the removal act 416. In particular, a disconnection of the position-determining device 202 from the interface 404 may be detected by the mode manager module 124. Then, responsive to detecting the removal act 416, mode manager module 124 may initiate various actions related to selecting a corresponding operational mode for the position-determining device 202.

Modes of the device are toggled between the second operational mode and the first operational mode responsive to the removal (block 312). For instance, when position-determining device 202 is removed from the mounting device 402 in FIG. 4, the operational mode may be toggled from navigation mode, as in arrangement 414, to phone mode, as in the arrangement 410. The position-determining device 202 may then be operated in the phone mode (e.g., the first operational mode) as in block 302.

While procedure 300 is described with respect to toggling between a navigation mode and a phone mode as depicted in FIG. 4, naturally other modes such as a media mode, game mode, internet mode and so forth may also be associated with the arrangements 410, 414. In an implementation, a user may configure the position-determining device 202 to set which mode is activated when the position-determining device 202 is inserted and when the position-determining device 202 is removed. It is further noted that toggling or switching between operational modes described herein occurs responsive to insertion or removal of the position-determining device 202 into or out of the mounting device 402 and without additional input from a user. Thus, a user need not make an affirmative selection of a mode such as through pressing a selectable button, navigating the device to select applications to open and close, and so forth.

Of course, a user may still manually select from among different available modes (navigation, phone, internet games, media, and so forth) in either the external arrangement 410 or inserted arrangement 414. However, the mode manager module 124 is configured to automatically select the default or "primary" operational mode associated with arrangement 410 when a removal act 416 is detected and to automatically select the default or "primary" operational mode associated with arrangement 414 when an insertion act 412 is detected. In this manner, the position-determining device 202 may be operated in a variety of different modes to provide a variety of different functionality and may be automatically switched to particular modes responsive to insertion or removal of the position-determining device 202 into and out of a corresponding mounting device 402.

It is noted that automatic switching or toggling of operational modes may also result in power management benefits. For instance, a navigation mode that is used continuously to calculate position, turn-by-turn instructions, and so forth may consume relatively more power than a phone mode or other operational modes. Thus, in navigation mode a battery may be depleted quickly in comparison with other modes. By switching to phone mode or other operational modes automatically when the electronic device 102 is removed from a corresponding mounting device 402, power consumption may be correspondingly decreased resulting in extended battery life.

Figure 5:
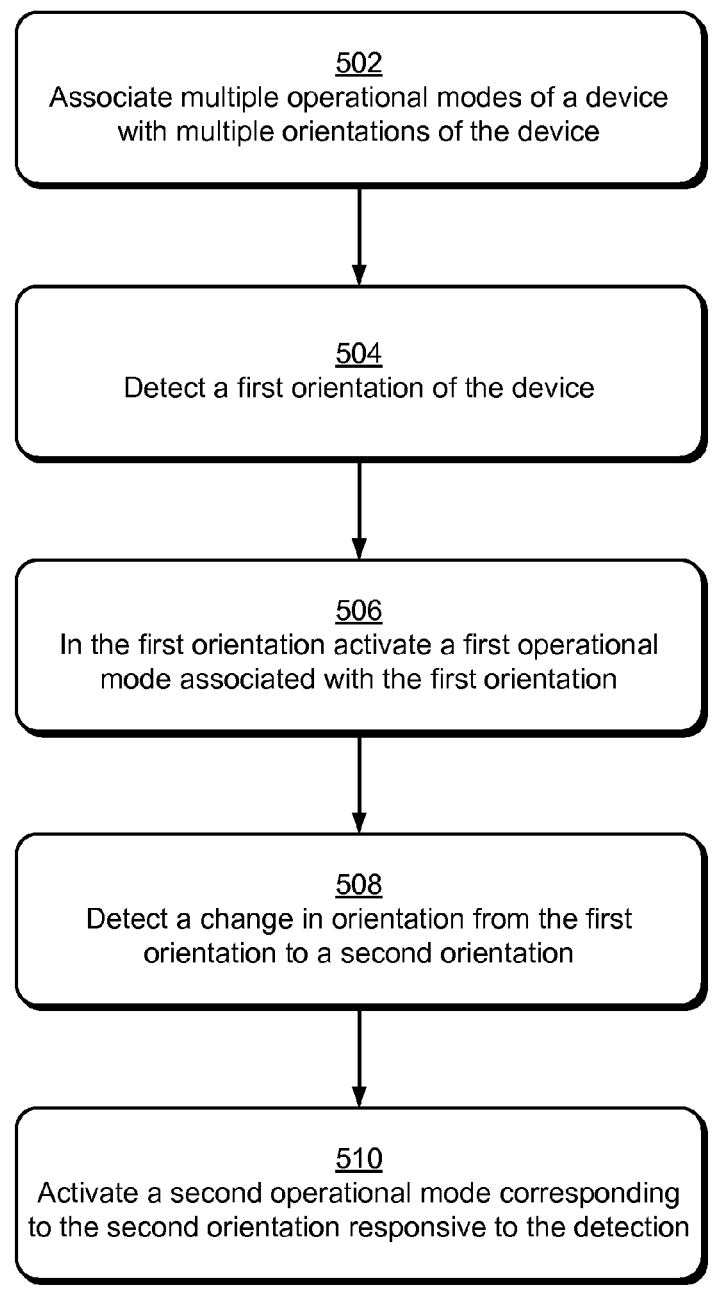
FIG. 5 is flow diagram depicting an exemplary procedure in which operational modes of an electronic device are activated based upon determination of an orientation of the device.

FIG. 5 depicts a procedure 500 in an exemplary implementation in which operational modes of a device are activated based upon determination of an orientation of the device. In discussing procedure 500, reference will be made to FIG. 6 which illustrates an exemplary implementation 600 showing multiple orientations of an example position-determining device 202 and corresponding operational modes that may be associated with the multiple orientations.

Multiple operational modes of a device are associated with multiple orientations of the device (block 502). For example, position-determining device 202 of FIG. 2 may be configured to provide a variety of functionality through different operational modes and corresponding device applications 126. For example, a position-determining module 122 may provide position-determining functionality in a navigation mode and a phone 214 application may provide mobile phone functionality in a phone mode. A variety of other modes is also contemplated, such as an Internet mode, media mode, a games mode, and so forth. Position-determining device 202 through the mode manager module 124 may associate different "primary" modes with different orientations of the device. For example, position-determining device 202 may be configured such that a first mode is automatically selected in portrait orientation and a second mode is automatically selected in landscape orientation. Additionally or alternatively, the mode manager module 124 may enable a user to configure which different operational modes are associated with different orientations of a position-determining device 202.

Figure 6:
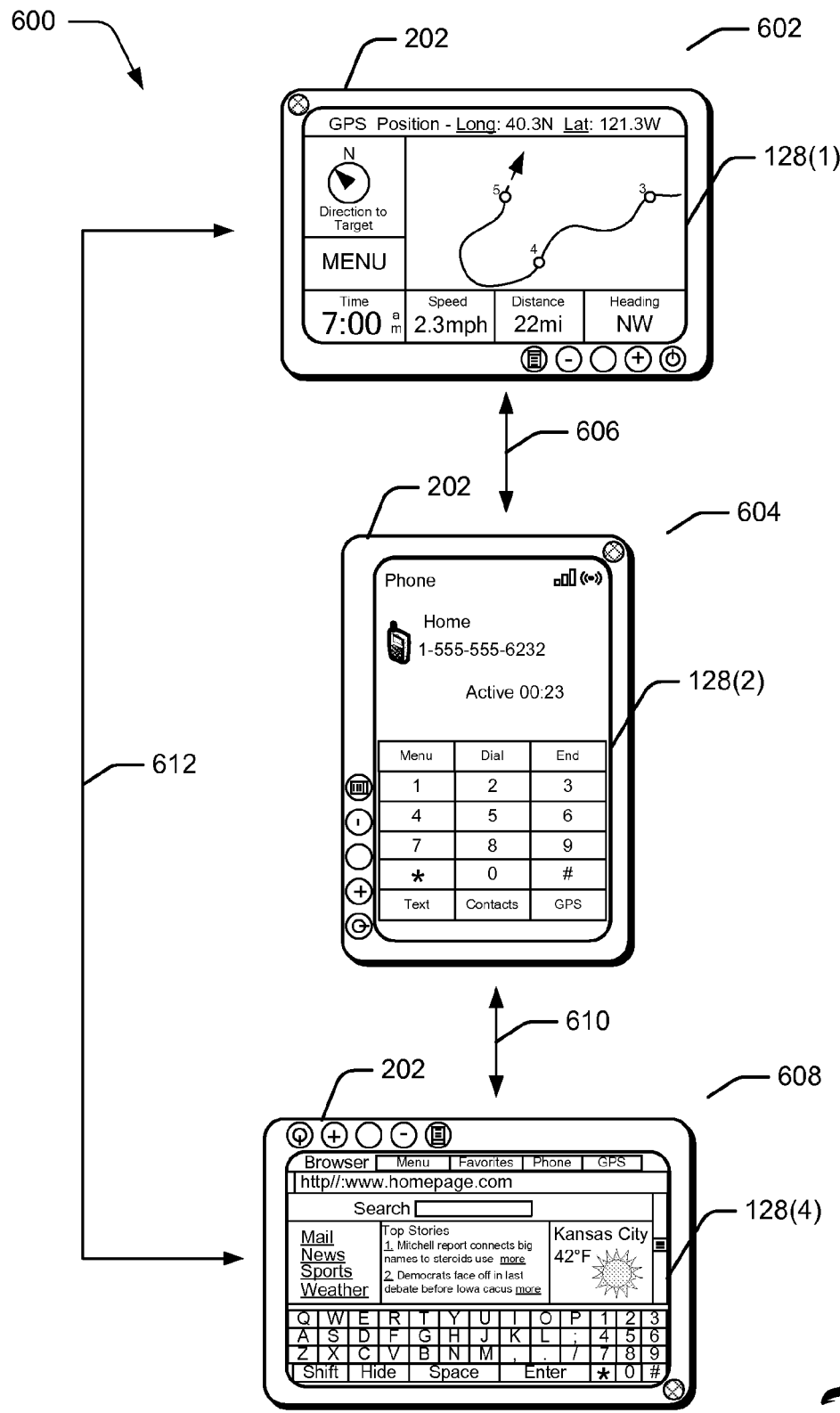
FIG. 6 is a diagram illustrating an exemplary implementation of the automatic device mode switching procedure depicted in FIG. 5.

Referring now to FIG. 6, an implementation 600 is depicted in which different operation modes are associated with different orientations of a device. For instance, FIG. 6 depicts a landscape orientation 602 and a portrait orientation 604 for a position-determining device 202. The position-determining device 202 may be interchanged between the orientations 602, 604 through manipulation act 606. In this case, manipulation act 606 corresponds to an approximate ninety degree rotation of the position-determining device 202, for example through manual manipulation by a user.

Further, each of the orientations 602, 604 may be associated with a different respective operational mode. In the example of FIG. 6 the landscape orientation 602 is illustrated as associated with a navigation mode to primarily provide position-determining functionality. Portrait orientation 604 is illustrated as associated with a phone mode to primarily provide mobile phone functionality.

A first orientation of the device is detected (block 504). In the first orientation, a first operational mode associated with the first orientation is activated (block 506). For example, a user of the position-determining device 202 of FIG. 6 may manipulate position-determining device 202 to be in the landscape orientation 602. As noted with respect to FIG. 2, position-determining device 202 may include an orientation detector 208 which may enable the mode manager module 124 to detect an orientation of the position-determining device 202. Orientation detector 208 may provide signals indicative of orientation which may be used by the mode manager module 124 to detect a change in orientation and to determine the current orientation. In this example, through the orientation detector 208, mode manager module 124 understands that position-determining device 202 is in the landscape orientation 602. Based on this determination that position-determining device 202 is manipulated into landscape orientation 602, mode manager module 124 may operate to activate navigation mode. For instance, position-determining module 122 corresponding to navigation mode may be executed and/or activated in an active state and a corresponding user interface 128(1) to provide position-determining functionality may be displayed.

A change in orientation from the first orientation to a second orientation is detected (block 508). A second operational mode corresponding to the second orientation is activated responsive to the detection (block 510). Continuing the preceding example, through the orientation detector 208, mode manager module 124 may detect that position-determining device 202 of FIG. 6 is manipulated into portrait orientation 604. Accordingly, mode manager module 124 may operate to activate phone mode. In phone mode, a corresponding phone 214 application corresponding to phone mode may be executed and/or activated in an active state and a corresponding user interface 128(2) to provide mobile phone functionality may be displayed. In this manner, operational modes of a position-determining device 202 may be selected, toggled or otherwise switched based upon a detected orientation of the position-determining device 202.

Naturally, another orientation may be associated with another operational mode. For example, FIG. 6 further depicts an "upside down" landscape orientation 608 that may be arrived at through a manipulation act 610. In this case, manipulation act 610 may corresponds to an approximate ninety degree rotation of the position-determine device 202 from the portrait orientation 604. Naturally, "upside down" landscape orientation 608 may also be arrived by an approximate one hundred and eighty degree rotation from the landscape orientation 602, which is represented by another manipulation act 612. In the example of FIG. 6, "upside down" landscape orientation 608 is illustrated as associated with an Internet mode to primarily provide Internet functionality.

Thus, when position-determining device 202 is manipulated into "upside down" landscape orientation 608, mode manager module 124 may operate to activate Internet mode. Accordingly, a browser 212 application corresponding to Internet mode may be executed and/or activated in an active state and a corresponding user interface 128(4) to provide Internet functionality may be displayed. Of course, the example position-determining device 202 of FIG. 6 may also be manipulated to an "upside down" portrait orientation (not shown), which may be associated with another operational mode, for example a media mode to primarily provide functionality related to playback and management of various media content.

It may be seen that the example position-determining device 202 of FIG. 6 is generally rectangular shaped. However, it is contemplated that another device employing the described techniques may have a different shape, for example a hexagon. In this example, there might be as many as six orientations and six operational modes associated with the six different orientations. A variety of other examples are also contemplated. Thus, the number of possible orientations and associated operational modes is not intended to be limited to the enumerated example of a rectangular position-determining device 202.

Further, it is noted that the orientation based operational mode switching techniques described with respect to FIG. 5 through 6 may be employed in combination with the mounting based operational mode switching techniques described with respect to FIGS. 3 through 4. For instance, mode manager module 124 may activate navigation mode when a device is inserted into a mounting device 402 as discussed in relation to FIG. 3-4. Then, when an orientation change is detected while the device is connected to the mounting device 402, a corresponding operational mode change may occur as discussed in relation to FIG. 5 through 6. Likewise, mode manager module 124 may activate phone mode when removed from a mounting device 402. Thereafter, when an orientation change is detected while the device is external to the mounting device 402, a corresponding operational mode change may again occur.

CONCLUSION

Although techniques for automatic device mode switching have been described in language specific to structural features and/or methodological acts, it is to be understood that the appended claims are not necessarily limited to the specific features or acts described. Rather, the specific features and acts are disclosed as exemplary forms of implementing the claimed devices and techniques for flight plan filling and upload to avionics.

What is claimed is:

1. A method comprising:
    operating an electronic device having a single housing and multiple operational modes with a phone mode configured to provide phone service functionality via a cellular network and automatically output a first user interface on a display device, the first user interface including a plurality of phone-specific icons;
    detecting insertion of the electronic device into the corresponding mounting device; and
    toggling from the phone mode to a navigation mode configured to provide position-determining functionality based upon signal data received from a plurality of satellites and automatically output a second user interface on the display device, the second user interface including a plurality of navigation-specific icons;
    wherein the phone mode is set as active when the electronic device is external to a corresponding mounting device and the navigation mode is set as active to provide position-determining functionality responsive to the detecting of the electronic device connected to the mounting device; and transitioning from a portrait orientation to a landscape orientation when the electronic device is connected to the mounting device;

wherein an icon relating to an active phone call is presented on the second user interface while the electronic device operates in the navigation mode.

2. A method as recited in claim 1, further comprising:
detecting removal of the electronic device from the corresponding mounting device; and
toggling from the navigation mode to the phone mode responsive to the detecting removal.

3. A method as recited in claim 2, wherein
when toggling from the phone mode to the navigation mode, phone service initiated in the phone mode automatically transitions to a hands-free operation in the navigation mode;
when toggling from the navigation mode to the phone mode, position-determining functionality initiated in the navigation mode continues to operate from a background state while the electronic device is set to operate in the phone mode.

4. A method as recited in claim 1, wherein the electronic device is a position-determining device configured to determine position based upon signal data received from a plurality of satellites via a global positioning system (GPS) receiver.

5. A method as recited in claim 1, wherein the navigation mode is a global positioning system (GPS) mode configured to provide position-determining functionality based upon signal data received from a plurality of satellites.

6. A method as recited in claim 1, wherein
when the phone mode is active, a first application is executed to output the first user interface to provide the phone mode functionality;
when the navigation mode is active, a second application is executed to output the second user interface on the display device to provide the navigation mode functionality.

7. A method as recite in claim 1, wherein a call status relating to an active phone call is presented on the second user interface while the electronic device operates in the navigation mode.

8. A method as recited in claim 1, wherein a call duration relating to an active phone call is presented on the second user interface while the electronic device operates in the navigation mode.

9. A method as recited in claim 1, wherein a button to terminate the active phone call is presented on the second user interface while the electronic device operates in the navigation mode.

10. A method as recited in claim 1, wherein a button to toggle from the navigation mode to the phone mode is presented on the second user interface while the electronic device operates in the navigation mode.

11. A position-determining device comprising:
a processor;
memory;
a display device;
a global positioning satellite (GPS) receiver to enable receiving of signal data from a plurality of satellites; and
one or more modules stored in the memory and executable on the processor to:

monitor connection of the position-determining device to a corresponding mounting device;
when the position-determining device is disconnected from the corresponding mounting device, select a phone mode to provide mobile phone functionality as an active operational mode for the position-determining device by outputting a first user interface on the display device, the first user interface including a plurality of phone-specific icons presented on the display device; and
when the position-determining device is connected to the corresponding mounting device, automatically select a navigation mode that utilizes the signal data received via the GPS receiver to output navigation instructions as an active operational mode for the position-determining device by outputting a second user interface on the display device, the second user interface including a plurality of navigation-specific icons presented on the display device;
transition the display device from a portrait orientation to a landscape orientation when the position-determining device is connected to the corresponding mounting device; and
present an icon relating to an active phone call on the second user interface while the position-determining device operates in the navigation mode;
wherein the processor, memory, display device, GPS receiver and modules are incorporated within a single housing.

12. A position-determining device as recited in claim 11, wherein connection of the position-determining device to the corresponding mounting device is monitored based upon detecting by the one or more modules of an electrical contact between the position-determining device and an interface of the corresponding mounting device.

13. A position-determining device as recited in claim 12, wherein said selecting of phone mode as active occurs automatically based upon the detecting of the disconnection of the position-determining device from the corresponding mounting device without user intervention.

14. A position-determining device as recited in claim 11, wherein when phone mode is selected as active, an application corresponding to phone mode is executed on the processor and the corresponding first user interface is output to provide the mobile phone functionality.

15. A position-determining device as recited in claim 11, wherein when navigation mode is selected as active, an application corresponding to navigation mode is executed on the processor and the corresponding second user interface is output to provide the navigation instructions.

16. A position-determining device as recited in claim 11, wherein:
the one or more modules include a phone module corresponding to the phone mode to provide the mobile phone functionality and a position-determining module corresponding to the navigation mode to provide position-determining functionality including the navigation instructions;
selecting the phone mode as active includes executing the phone module in an active state and executing the position-determining module in a background state; and
selecting the navigation mode as active includes switching states of the phone module and the position-determining module, such that the phone module is executed in the background state and the position-determining module in executed the active state.

17. A method as recite in claim 11, wherein the processor is further operable to present a call status relating to an active phone call on the second user interface while the electronic device operates in the navigation mode.

18. A method as recited in claim 11, wherein the processor is further operable to present a call duration relating to an active phone call on the second user interface while the electronic device operates in the navigation mode.

19. A method as recited in claim 11, wherein the processor is further operable to present a button to terminate the active phone call on the second user interface while the electronic device operates in the navigation mode.

20. A method as recited in claim 11, wherein the processor is further operable to present a button to toggle from the navigation mode to the phone mode on the second user interface while the electronic device operates in the navigation mode.

21. A method comprising:
associating a first orientation and a second orientation of an electronic device having a single housing with a phone operational mode and a navigation operational mode of the electronic device respectively;
detecting manipulation of the electronic device into the first orientation by receiving signals from an orientation detector provided with the electronic device to indicate orientation;
activating the phone operational mode responsive to the detecting of the manipulation of the electronic device into the first orientation by outputting a first user interface including a plurality of phone-specific icons on a display device;
detecting manipulation of the electronic device into the second orientation by receiving signals from the orientation detector; and
activating the navigation operational mode responsive to the detecting of the manipulation of the electronic device into the second orientation by outputting a second user interface including navigation-specific icons on the display device;
wherein the first orientation is a portrait orientation of the electronic device and the second orientation is a landscape orientation of the electronic device
wherein the electronic device is transitioned from a portrait orientation into a landscape orientation when coupled with the mounting device; and
wherein an icon relating to an active phone call is presented on the second user interface while the electronic device operates in the navigation mode.

22. A method as recited in claim 21, wherein an application corresponding to phone mode is executed on a processor included within the single housing of the electronic device to provide mobile phone functionality when the phone operational mode is activated.

23. A method as recited in claim 21, wherein the navigation mode is configured to provide position-determining functionality based upon signal data received from a plurality of satellites.

24. A method as recited in claim 21, wherein an application corresponding to navigation mode is executed on a processor included within the single housing of the electronic device to provide the position-determining functionality when the navigation mode is activated.

25. A method as recited in claim 21, further comprising:
associating a third orientation of the electronic device with a third operational mode of the electronic device;
detecting manipulation of the electronic device into the third orientation by receiving signals from the orientation detector;
activating the third operational mode responsive to the detecting of the manipulation of the device into the third orientation.

26. A method as recite in claim 21, wherein a call status relating to an active phone call is presented on the second user interface while the electronic device operates in the navigation mode.

27. A method as recited in claim 21, wherein a call duration relating to an active phone call is presented on the second user interface while the electronic device operates in the navigation mode.

28. A method as recited in claim 21, wherein a button to terminate the active phone call is presented on the second user interface while the electronic device operates in the navigation mode.

29. A method as recited in claim 21, wherein a button to toggle from the navigation mode to the phone mode is presented on the second user interface while the electronic device operates in the navigation mode.

30. A position-determining device comprising:
a processor;
memory;
a display device;
an orientation detector to provide signals indicative of orientation of the manipulated position-determining device; and
one or more modules stored in the memory and executable on the processor to:
associate a plurality of orientations of the position-determining device with a plurality of operational modes, wherein each of said plurality of operational modes is configured to provide different associated functionality when selected as active for the position-determining device;
detect an orientation of the position-determining device based upon signals received from the orientation detector; and
automatically select as active an operational mode of said plurality of operational modes that is associated with the detected orientation;
wherein a navigation mode is associated with a first orientation and configured to output a first user interface including navigation-specific icons on the display device and provide position-determining functionality based upon signal data received from a plurality of satellites;
wherein a phone mode is associated with a second orientation and configured to output a second user interface including a plurality of phone-specific icons on the display device and provide phone service via a cellular network;
wherein the processor, memory, display device, orientation detector, and modules are incorporated within a single housing;
wherein the electronic device is manipulated from a portrait orientation into a landscape orientation when coupled with the mounting device; and
wherein an icon relating to an active phone call is presented on the second user interface while the electronic device operates in the navigation mode.

31. A position-determining device as recited in claim 30, wherein automatically selecting an operational mode comprises:

executing an application module associated with the operational mode on the processor in an active state;

outputting the first user interface or the second user interface to provide said functionality associated with the selected operational mode; and executing at least one application associated with a said operational mode that is not selected to execute in a background state.

32. A method as recite in claim 30, wherein a call status relating to an active phone call is presented on the second user interface while the electronic device operates in the navigation mode.

33. A method as recited in claim 30, wherein a call duration relating to an active phone call is presented on the second user interface while the electronic device operates in the navigation mode.

34. A method as recited in claim 30, wherein a button to terminate the active phone call is presented on the second user interface while the electronic device operates in the navigation mode.

35. A method as recited in claim 30, wherein a button to toggle from the navigation mode to the phone mode is presented on the second user interface while the electronic device operates in the navigation mode.

* * * * *